US005235519A

United States Patent [19]

Miura

[11] Patent Number: 5,235,519

[45] Date of Patent: Aug. 10, 1993

[54] CARD VENDING MACHINE

[76] Inventor: Atsushi Miura, 79 Statesman Square, Scarborough, Ontario, M1S 4H7, Canada

[21] Appl. No.: 661,667

[22] Filed: Feb. 27, 1991

[51] Int. Cl.[5] .............. G06F 15/20

[52] U.S. Cl. .............. 364/479; 364/468; 364/478

[58] Field of Search .............. 364/479, 478, 468, 471; 395/155; 235/381; 414/793, 796

[56] References Cited

U.S. PATENT DOCUMENTS

| | | | |
|---|---|---|---|
| 4,818,854 | 4/1989 | Davies et al. | 235/381 |
| 4,873,643 | 10/1989 | Powell et al. | 364/468 |
| 5,029,099 | 7/1991 | Goodman | 364/479 |
| 5,036,472 | 7/1991 | Buckley et al. | 364/479 |
| 5,038,293 | 8/1991 | Goodman | 364/479 |
| 5,039,848 | 8/1991 | Stoken | 235/381 |
| 5,056,029 | 10/1991 | Cannon | 364/468 |

*Primary Examiner*—Jerry Smith

*Assistant Examiner*—Paul Gordon

*Attorney, Agent, or Firm*—Dressler, Goldsmith, Shore, Sutker & Milnamow, Ltd.

[57] ABSTRACT

A coin operated, computer controlled vending machine prints and dispenses novelty business cards, change of address cards and the like. The vending machine comprises a computer having a keyboard and video screen. The vending machine includes a card dispenser, a printer and a coin acceptor which are interconnected with and controlled by the computer. When a user inserts a minimum preset amount of money into the coin acceptor, the card dispenser is activated whereby a preset number of blank cards are dispensed to the user. The computer is simultaneously activated and prompts the user to input the information to be printed onto the cards. The information to be printed on the cards is keyed into the computer and is visually displayed on the video screen. Various printed card formats are available.

15 Claims, 12 Drawing Sheets

CARD VENDING MACHINE

FIELD OF THE INVENTION

This invention relates to coin operated, computer controlled vending machines for printing and dispensing cards, such as business cards.

BACKGROUND OF THE INVENTION

A variety of vending machines are known wherein a customer may purchase an article or articles upon depositing a preset amount of money. The money activates a dispenser in some fashion which results in the article being dispensed to the customer. Known vending machines dispense a variety of products including books of stamps, movie cassettes, computer programs, food and beverages, photographs of the customer and the like. While useful as far as they go, none of the vending machines known allow for a customer to custom print novelty business cards, change of address cards and the like wherein the information is input by the customer as part of the vending procedure.

A common means for dispensing flat articles from vending machines is to criss-cross them in a vertical stack. The release mechanism generally comprises two pairs of coupled release arms on which the articles are stacked and which either retract or drop down thereby releasing the article resting thereon. The mechanical mechanisms generally involve cams and cam followers, or circular cam wheels or bell cranks coupled using crank pins just to mention a few. A general drawback to using mechanical release mechanisms is their proclivity for jamming and/or requiring periodic maintenance.

SUMMARY OF THE INVENTION

The present invention provides a vending machine for printing and dispensing customer designed novelty business and information cards.

The subject invention includes a housing with a card storage means mounted in the housing and a card dispensing means coupled to the storage means for dispensing cards stored within the housing. A control means is provided which includes manual entry means, data receiving and storage means, display means and printing means. Included is a processing means for controlling the control means which is responsive to data input by a user and which provides instructions to the user at various stages in the vending procedure which must be carried out in order to advance to the next stage of the vending procedure. A vending machine having a computer means with a memory and input means for allowing a user to input data into the memory means which is to be entered onto a card. Included is a display means for visually displaying the data input by the user. An activation means is provided for activating the processing means and the card dispensing means which is responsive to a preset amount of money or the equivalent thereof.

According to another aspect of the invention a vending machine for printing and dispensing user designed cards includes a housing having a card access slot located along the front of the housing. A computer is provided having a keyboard for entering data by the customer, a memory, and a video display terminal. Included is a printer interconnected with the computer for printing the data input by the customer onto the blank cards. An interactive control program for controlling the computer guides a user through the vending procedure including prompting the user to input data, wherein the control program commands the memory and the display terminal to respectively store and display the input data in addition to commanding the printer to print the data onto the cards. At least one card storage magazine is provided for storing rectangular cards in a cross stacked arrangement of substacks of cards. At least one card dispensing mechanism is provided having right angularly disposed and inwardly pointing pairs of opposed solenoids. The solenoids each are provided with support platforms attached to the inwardly pointing ends thereof for supporting the substacks of cards. The platforms are moveable between inward and outward limiting positions which correspond to positions of clearance with respect to the length and width of the cards. A ramp extends from below the card dispenser and the printer to the card access slot located on the front of the housing. A vending machine activator is provided for activating the control program, the card dispenser and the printer which is responsive to a preset amount of money.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

The preferred embodiments of the vending machine of the subject invention will be discussed with reference to the Figures wherein like numerals refer to like parts.

Figure 1:
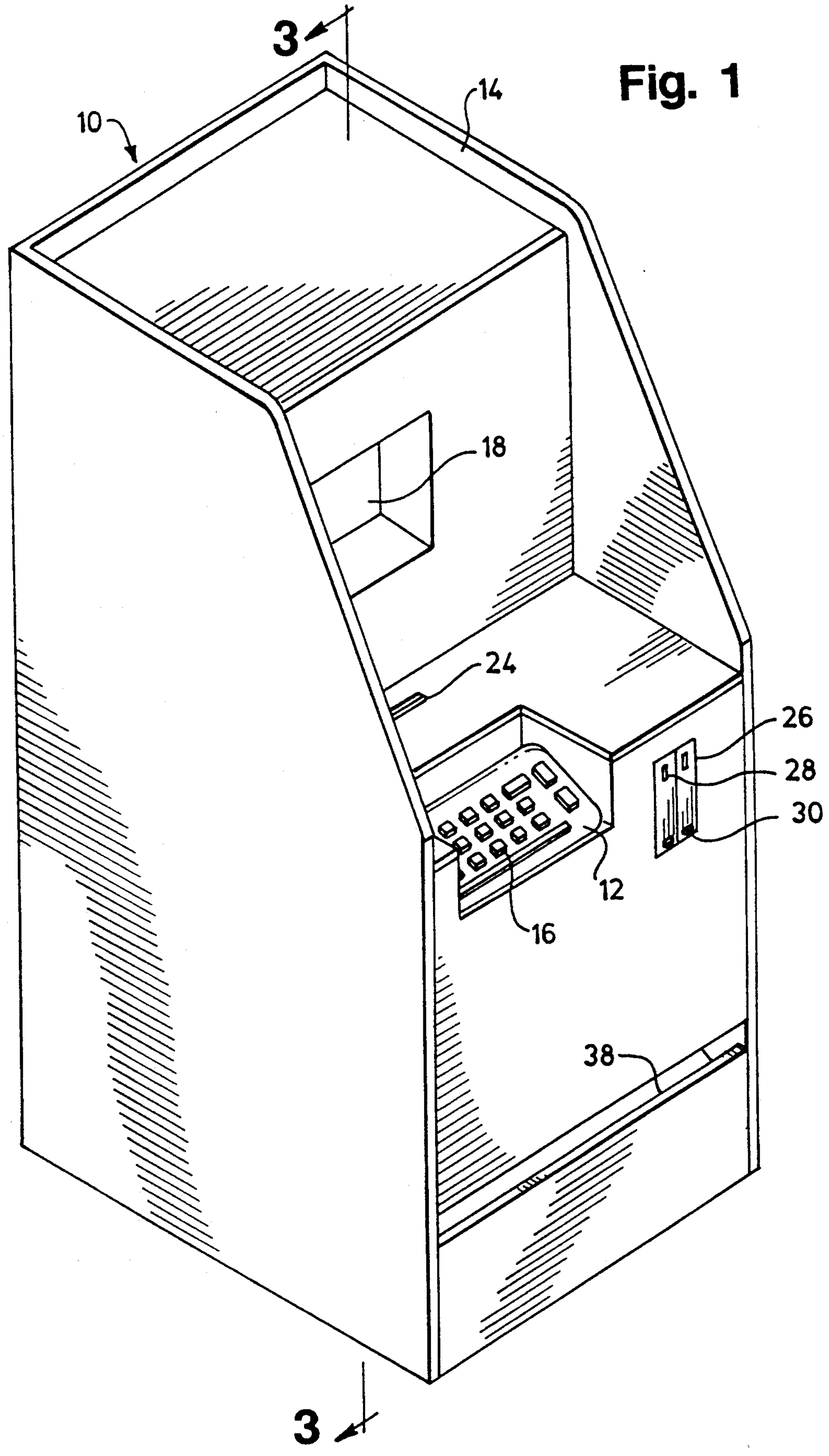
FIG. 1 is a perspective view of the vending machine of the subject invention.
Figure 2:
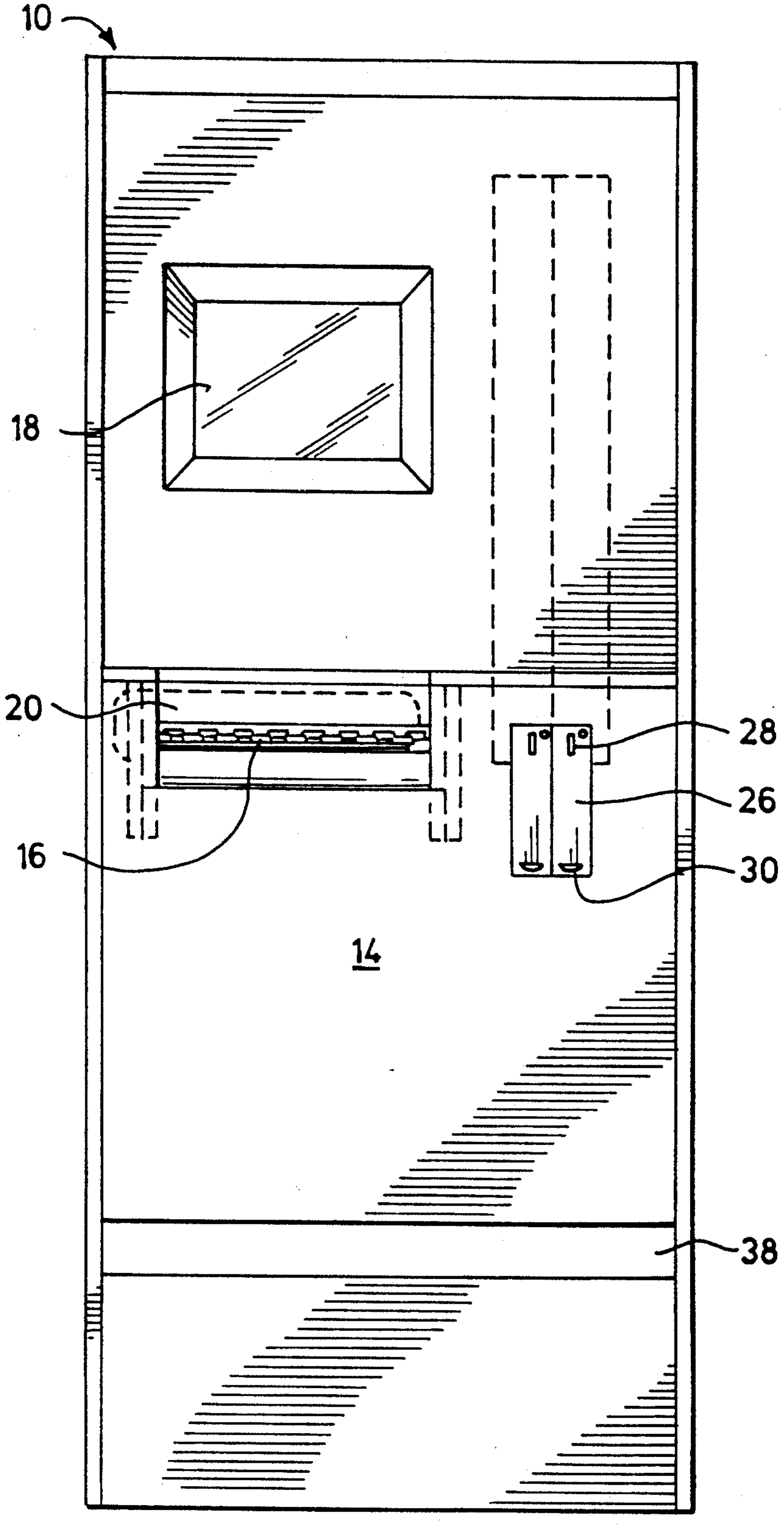
FIG. 2 is a front view of the vending machine.
Figure 3:
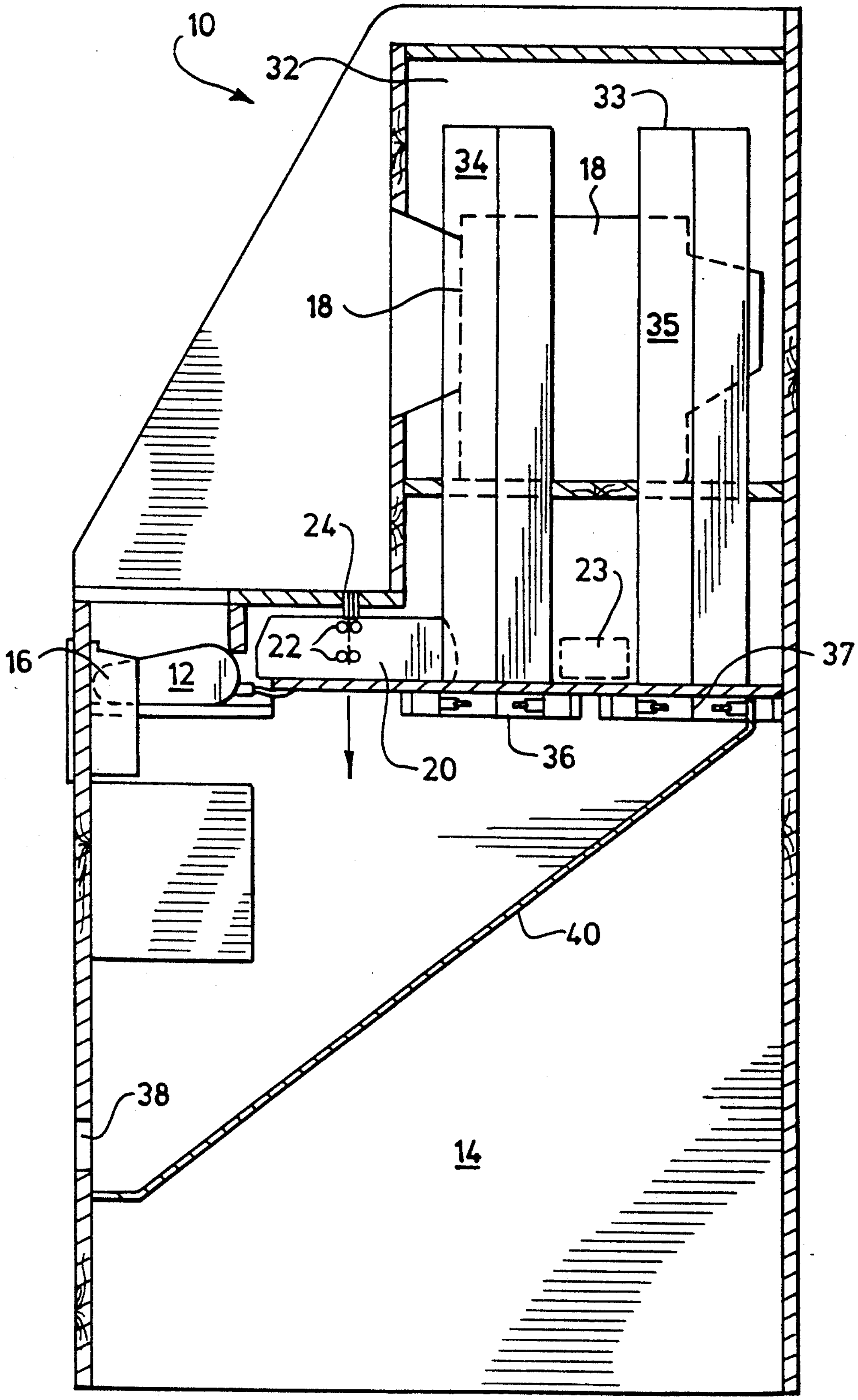
FIG. 3 is a sectional side view of the vending machine taken along the lines 3—3 of FIG. 1.

Referring first to FIGS. 1, 2 and 3, a novelty card vending machine shown at 10 includes a computer 12 mounted in the front side of a housing 14 of vending machine 10. Computer 12 comprises a central processing unit (CPU) along with a random access memory (RAM), a keyboard 16 and a video screen or cathode ray tube (CRT) 18 mounted above keyboard 16 in the front side of housing 14. Vending machine 10 is provided with a printer 20 which has a modified card feeder mechanism 22 located at the card input of printer 20. Machine 10 includes a printer card slot 24 mounted in housing 14 behind keyboard 16. Printer 20 is mounted below card slot 24 such that when a card is inserted through slot 24 the card is input into card feeder mechanism 22.

In this particular embodiment of the invention a floppy disc drive 23 is contained within housing 14 and forms part of vending machine 10. A control program is loaded from a disc in disc drive 23 into the RAM of computer 12 when vending machine 10 is turned on. It will be appreciated however that other arrangements may be readily used depending on the type of computer utilized. For example, more sophisticated computers may have the control program stored permanently on a hard disc or in a Read Only Memory (ROM) chip.

Vending machine 10 includes a coin acceptor 26 mounted to the right of keyboard 16 which comprises a coin acceptor slot 28 and a coin return 30. In an alternative embodiment, a monetary equivalent may be used such as a credit card reader may also be included for payment means (not shown).

A pair of identical card dispensers 32, 33 are provided each of which comprises a card storage housing or magazine 34, 35 mounted above a card dispensing mechanism 36, 37. One of the dispensers is a spare which is utilized when the other is empty. A card access slot 38 is provided along the front of housing 14 below computer 12. A ramp 40 extends from below card dispensing mechanism 36, 37 to access slot 38. Printer 20 may be mounted so that the card output of printer 20 is located above ramp 40, or alternatively, printer 20 may be mounted so that its output is above a separate ramp (not shown) in communication with access slot 38.

Figure 4:
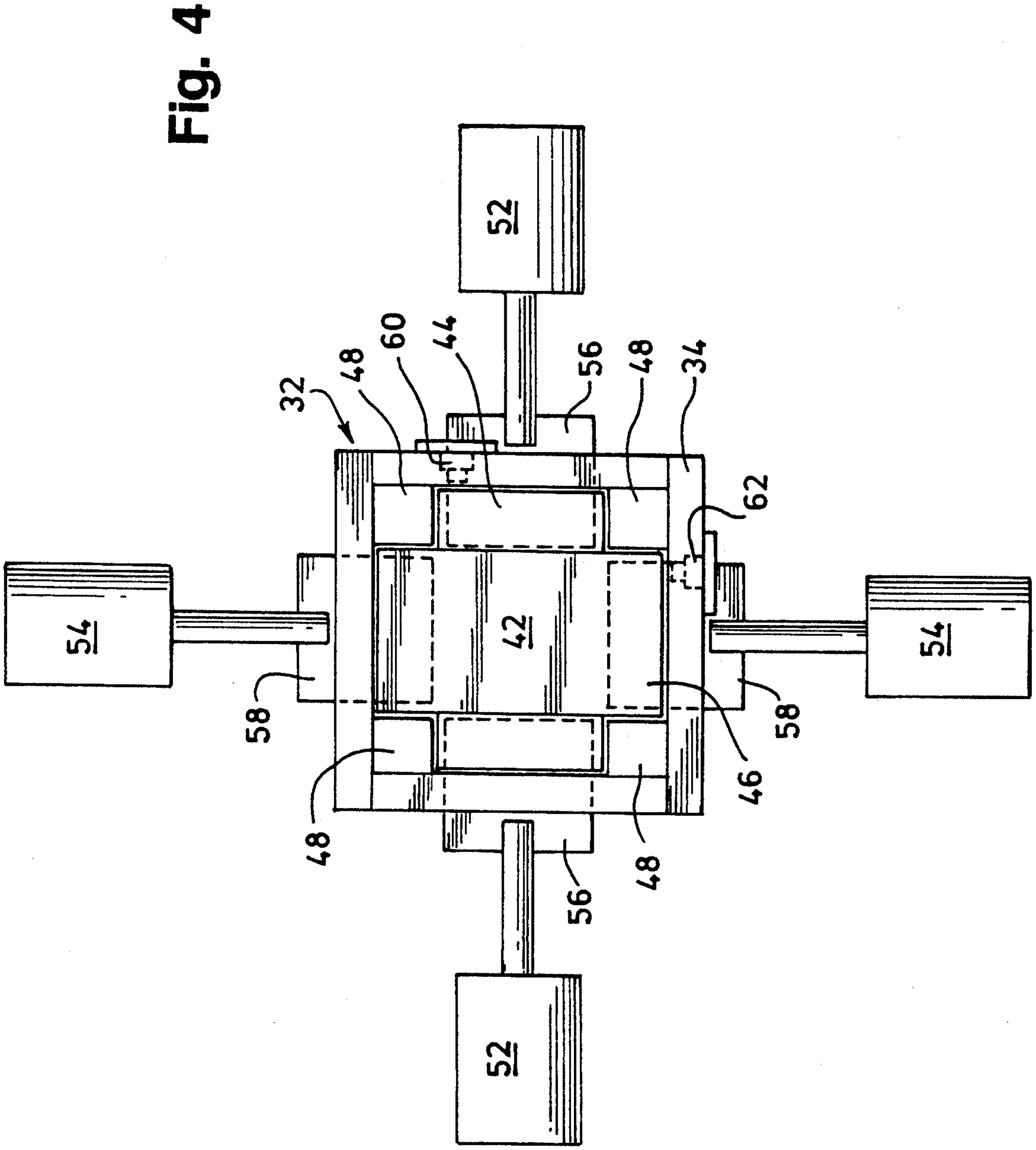
FIG. 4 is a top view of the card dispensing mechanism of the vending machine.
Figure 5:
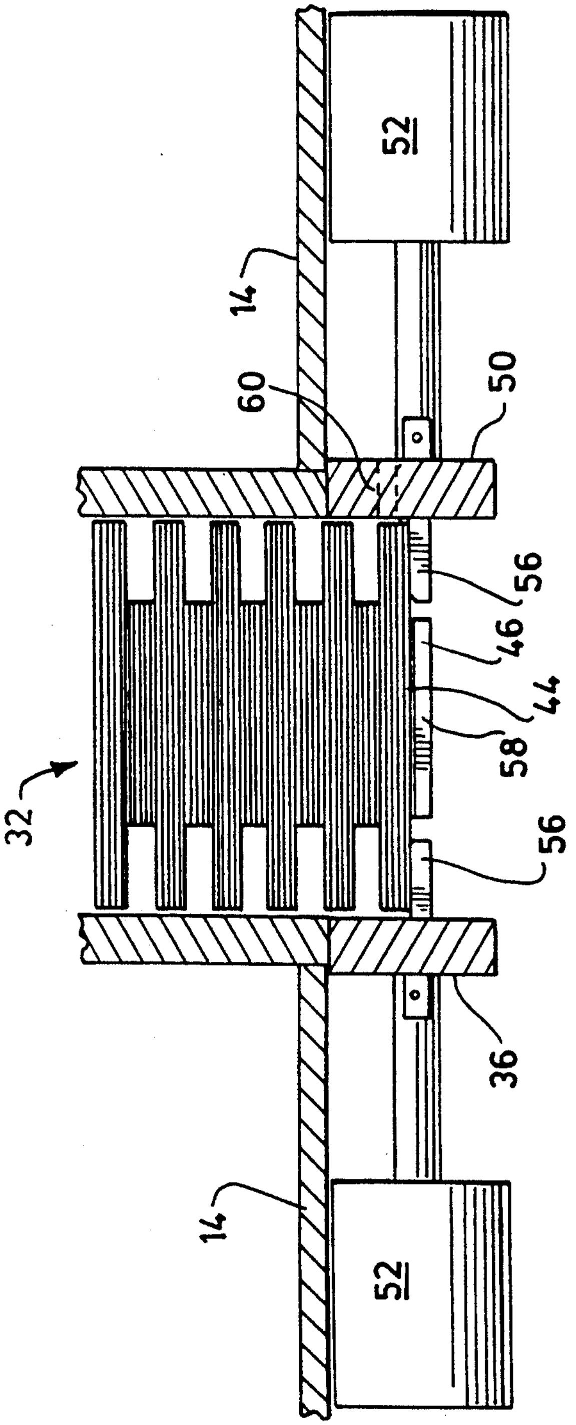
FIG. 5 is a sectional side view of the card dispensing mechanism of FIG. 4.

Referring now to FIGS. 4 and 5, the structure and operation of card dispenser 32 will now be discussed. Housing 34 has internal dimensions of length and width slightly greater than the length of a card 42 shown stacked therein. In this way a plurality of cards may be vertically stacked with the cards in the horizontal position within housing 34 in a criss-crossed manner as shown in FIGS. 4 and 5. Cards 42 are stacked by criss-crossing sub-stacks, two of which are shown at 44 and 46, wherein the sub-stacks each comprise a plurality of cards 42. Extending vertically along the interior corners of housing 34 are rectangular guide members 48 which ensure that sub-stacks 44 and 46 remain fixed in the criss-crossed position within housing 34.

Dispensing mechanism 36 is located below card dispenser 32 and is mounted in housing 14 and comprises a generally rectangular frame member 50 and two right angularly disposed inwardly pointing pairs of opposed solenoids, 52 and 54. The ends of each of the solenoids of the pairs 52 and 54 are provided with generally rectangular, flat platform members 56 and 58, which are substantially of the same width as blank cards 42 stacked in housing 34. The two pairs of opposed platform members 56 and 58 are insertable through the walls of frame member 50 and may protrude into the interior thereof.

The two pairs of solenoids 52 and 54 (and hence the two pairs of platforms 56 and 58) are moveable between an outward limiting position (not shown) and an inward limiting position, see FIG. 4. The outward limiting position corresponds to a position of clearance with respect to the length of the cards while the inward limiting position corresponds to a position of clearance with respect to the width of the cards. Each pair of opposed solenoids are coupled to move in unison between the outward and inward limiting positions.

Dispenser mechanism 36 is provided with two photocell detectors 60 and 62 mounted at right angles with respect to one another in frame 50 at a level above the top surface of the platforms corresponding to half the thickness of a sub-stack of cards and orientated to point towards the cards stacked within housing 34 resting on the platforms. Photocells 60 and 62 and each of the solenoids of the two pairs 52 and 54 are interconnected with computer 12 in a manner to be discussed below. When a sub-stack of cards is resting directly on one of the pairs of opposed platforms, the photocell adjacent to the edge of the sub-stack will detect the presence of said sub-stack by detecting reflected light therefrom and provide an appropriate output signal to computer 12. The second photocell mounted in frame 50 at right angles to the first photocell, and at the same level, will not detect the presence of any cards and provides an appropriate signal to computer 12 indicating this situation.

Figure 6:
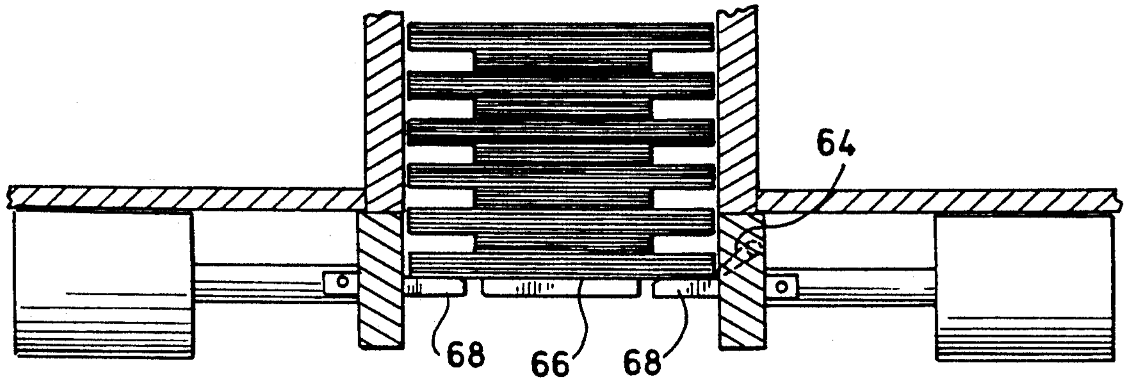
FIG. 6 illustrates an alternative view of the card detector utilized by the card dispensing mechanism of the present invention.

Referring to FIG. 6, micro-switches such as that shown at 64 may be used as an alternative to photocell detectors 60 and 62 for detecting the presence of the card sub-stacks. When a sub-stack of cards 66 is resting on a pair of support platforms 68, micro-switch 64 will be pivoted to the ON position and will send an appropriate signal to computer 12. The micro-switch at right angles with respect to switch 64 will be in the off position (horizontal) which similarly will be signalled to computer 12.

The structure and operation of card feeder 22 will now be described with reference to FIG. 7. Feeder mechanism 22 comprises a pair of card rollers 74 mounted above a printer head 76 (which forms a part of printer 20) and a pair of card rollers 78 mounted below printer head 76. Feeder mechanism 22 is provided with a first photocell detector 80 mounted above rollers 74 and a second photocell detector 82 mounted below rollers 74. When a card 84 is inserted through card slot 24 into feeder 22 it activates photocell 80 when it passes thereby. When activated (the controlling circuit will be described below) photocell 80 sends a signal to computer 12 which in turn sends a signal to activate rollers 74 and 78. When card 84 is fed past detector 82, the latter is activated which sends a signal to computer 12 which in turn sends a signal to rollers 74 to stop rotating after a preset time sufficient to allow card 84 to be fed to the appropriate position adjacent printer head 76 for printing of the first line. When the complete text has been printed onto card 84, rollers 78 feed card 84 through an access opening 86 in housing 14 whereupon card 84 drops down onto ramp 40 which in turn is in connected to card access slot 38, see FIG. 1.

An alternative arrangement to card housing 34 and card feeder mechanism 22 which the inventor contemplates as part of the subject invention comprises a printer using a paper roll and provided with a cutter with preset values for the length of the paper programmed into the printer feed mechanism.

Figure 8A:
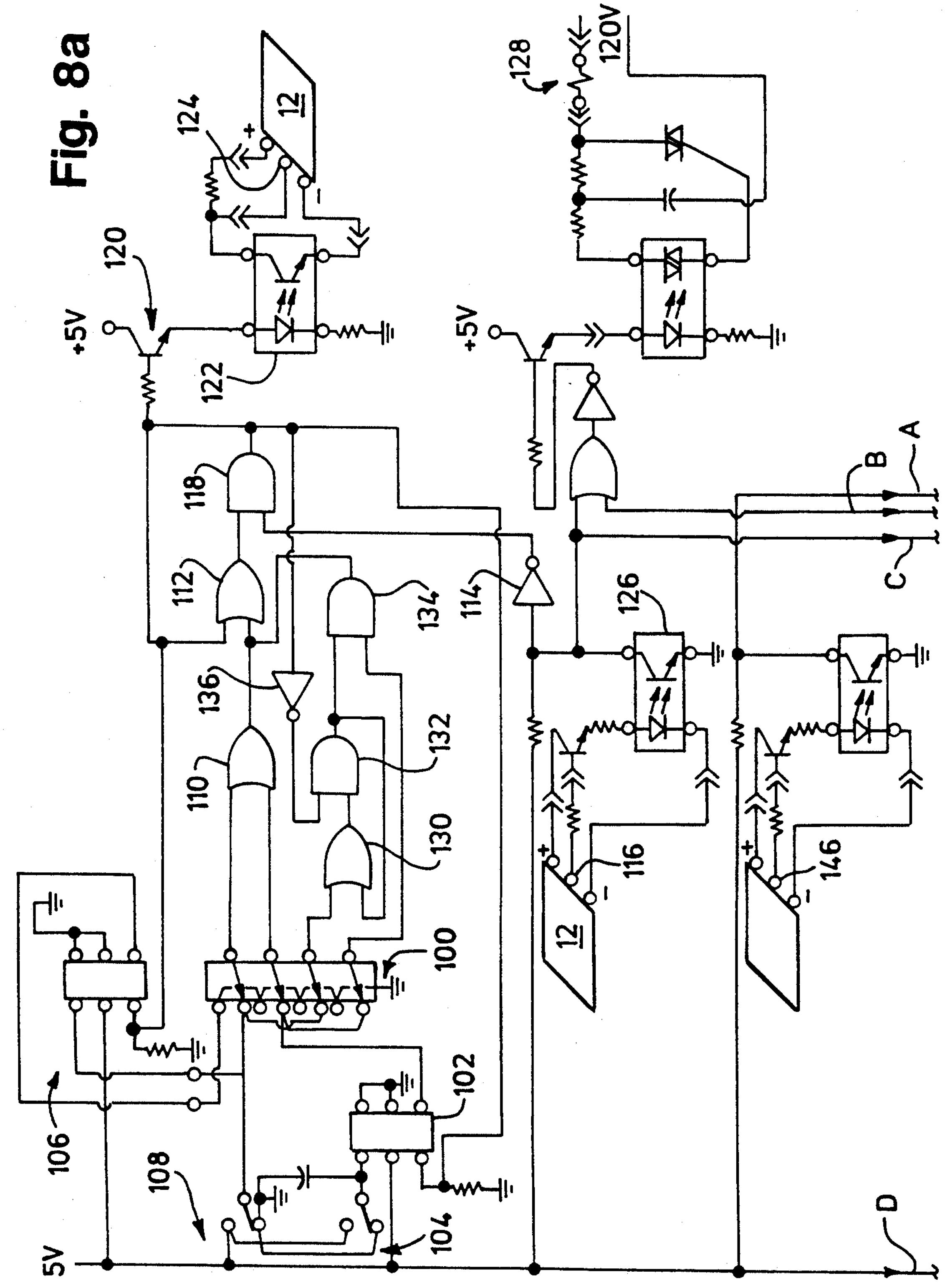
FIG. 8*a* is a schematic circuit diagram of the circuit interconnecting the computer with the coin acceptor.
Figure 8B:
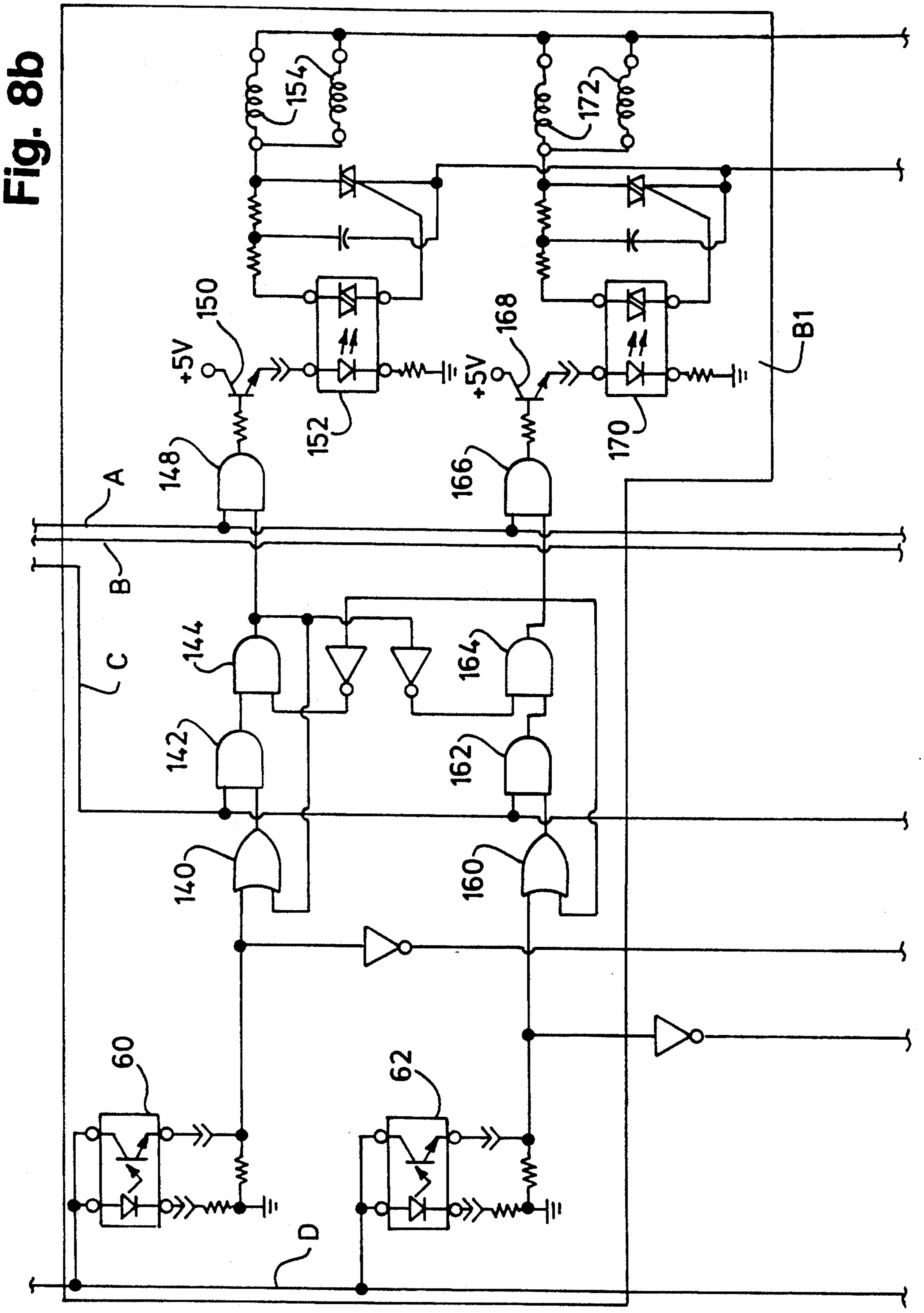
FIG. 8*b* and 8*c* are a schematic circuit diagram of the circuit interconnecting the computer with the card dispenser.
Figure 8C:
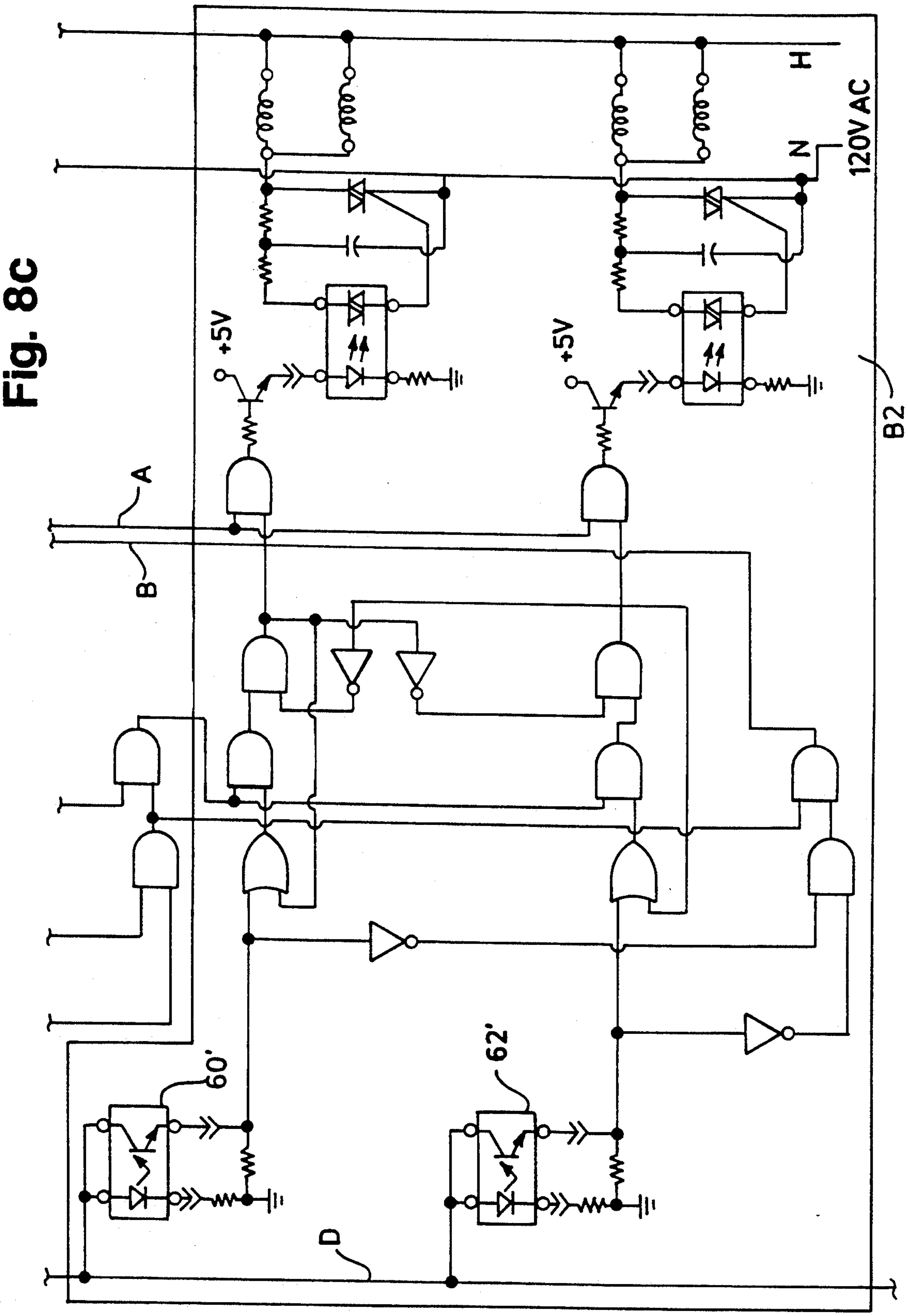
Figure 8D:
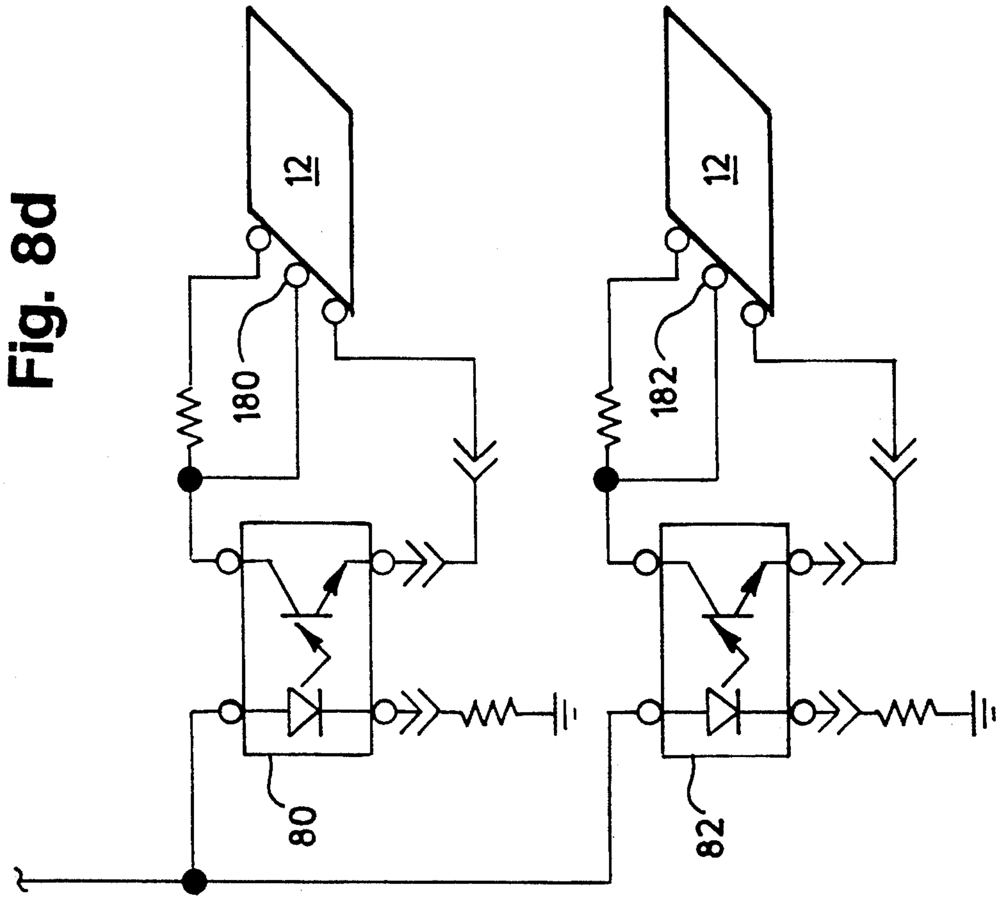
FIG. 8*d* is a schematic circuit diagram of the circuit interconnecting the computer with the printer feeder mechanism.

Referring to FIG. 1 and the schematic circuit diagram of FIG. 8*a*, the circuit interconnecting computer 12 with coin acceptor 26 will be described.

A dip-switch 100 is preset to the cost for dispensing and printing the cards (e.g. $1.00) while a counter chip 102 counts the coins deposited into coin slot 28 and actuates limit switch 104 when four quarters have been deposited. Alternatively, when more than two dollar coin has been deposited, counter chip 106 counts the coins which actuate limit switch 108. Counter chip 106 is used only for counting dollar coins when the preset price is higher than two dollars. When either limit switch 104 or 108 is actuated, the output of OR gate 110 goes high causing the output of OR gate 112 to go high. The high output of OR gate 112 in conjunction with the output of NOT gate 114 being high when there is no output from output 116 of computer 12 causes the output of AND gate 118 to go high. When the output of AND gate 118 goes high, transistor 120 turns on which in turn activates an optical coupler 122 whereby the voltage of input 124 goes low. After input 124 detects that the correct amount of money has been deposited the output of NOT gate 114 goes low due to output 116 going low which deactivates an optical coupler 126 thereby de-energizing a coin return solenoid 128 causing excess deposited coins to be rejected.

OR gate 130, AND gates 132, 134 and NOT gate 136 are utilized when a different price is selected.

Referring to FIGS. 4, 8*a*, 8*b* and 8*c*, the circuit interconnecting computer 12 with card dispenser 32 works as follows. Since vending machine 10 comprises two card magazines 32 and 32', the circuit of FIGS. 8*b* and 8*c* has essentially two identical circuits enclosed by boxes B1 and B2 which are each for a separate card magazine. The circuit enclosed by B1 which forms the circuit interconnecting dispenser 32 and computer 12 will be discussed only. When one of the two photodetectors 60 or 62, say for example 60, detects a sub-stack of cards resting on the opposed platforms adjacent detector 62, the output of OR gate 140 goes high. When the minimum preset amount of money has been deposited, output 116 and 148 (FIG. 8*a*) goes low and the output of AND gates 142, 144 and 148 go high. High output of AND gate 148 turns on transistor 150 thereby turning on optical coupler 152. When optical coupler 152 turns on, the pair of solenoids at 54 are energized thereby retracting the opposed platforms to which they are attached s that the sub-stack of cards resting thereon fall to ramp 40 below. Output 146 (FIG. 8*a*) is adapted to adjust the length of time for which the solenoids are energized in order to ensure that the cards have enough time to fall clear. Then output 146 (FIG. 8*a*) goes high whereby output 148 goes low and the solenoids are de-energized.

Alternatively, if the sub-stack of cards is resting on the opposed platforms adjacent photodetector 62, then the output of OR gate 160 goes high, and when the minimum preset amount of money is deposited, output 116 of computer 12 goes low and the outputs of AND gates 162, 164 and 166 go high. The high signal at the output of AND gate 166 turns on transistor 168 thereby activating optical coupler 170 and energizing the solenoids at 172.

When card dispenser 32 is empty, dispenser 32' is utilized wherein the circuit enclosed by box B2 forms the interconnection circuit and operates in the identical fashion to that enclosed by box B1.

Figure 7:
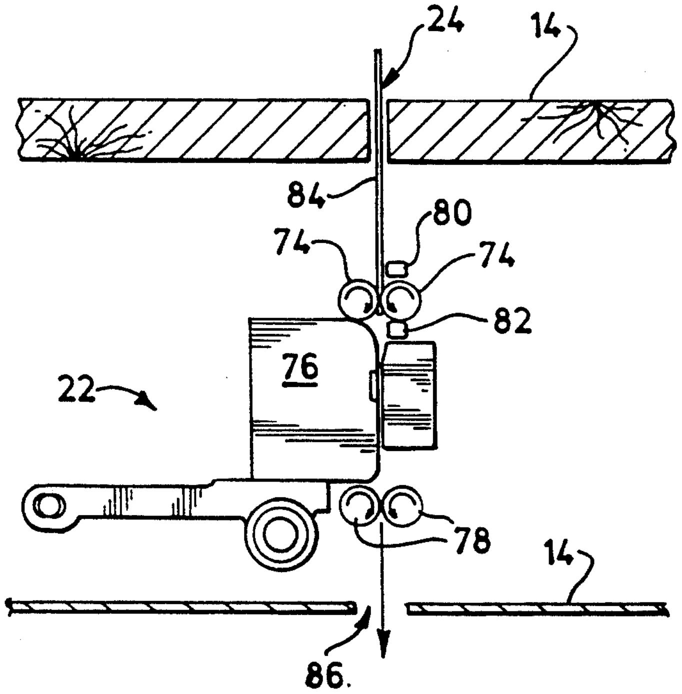
FIG. 7 is a blowup of the side view of the printer and card feeding mechanism of FIG. 3.

Referring now to FIGS. 7 and 9*d*, the circuit interconnecting computer 12 with card feeder mechanism 22 comprises photocell detector 80 coupled to input 180 of computer 12 and photocell detector 82 coupled to input 182 of computer 12. When a card is inserted into card feeder 22 and passes in front of photocell detector 80, detector 80 generates a voltage which is applied to input 180. This causes computer 12 to activate rollers 74 as discussed above and feeds the blank card past printer head 76. When the blank card is fed past detector 82, a voltage signal is applied to input 182 which causes rollers 74 to stop turning after a preset period of time corresponding to the time for the card to become properly positioned within printer head 76. Once the card has been positioned within printer head 76, printer 20 can accept commands from computer 12. Printer 20 and card feeder mechanism is activated only when output 116 (FIG. 8*a*) is low i.e. only after the correct preset amount of money has been deposited.

It will be appreciated that the circuits of FIGS. 8*a*, 8*b*, 8*c* and 8*d* represent only one possible means of interconnecting computer 12 with card dispenser 32, card feeder 22 and coin acceptor 26. It will be obvious to those skilled in the art that computer 12 itself may be adapted to directly control the printer feeder, the card dispenser and the coin acceptor. For example, the coin detector circuit of FIG. 8*a* described above may be replaced using a computer program to determine when the preset amount of money has been deposited.

Figure 9:
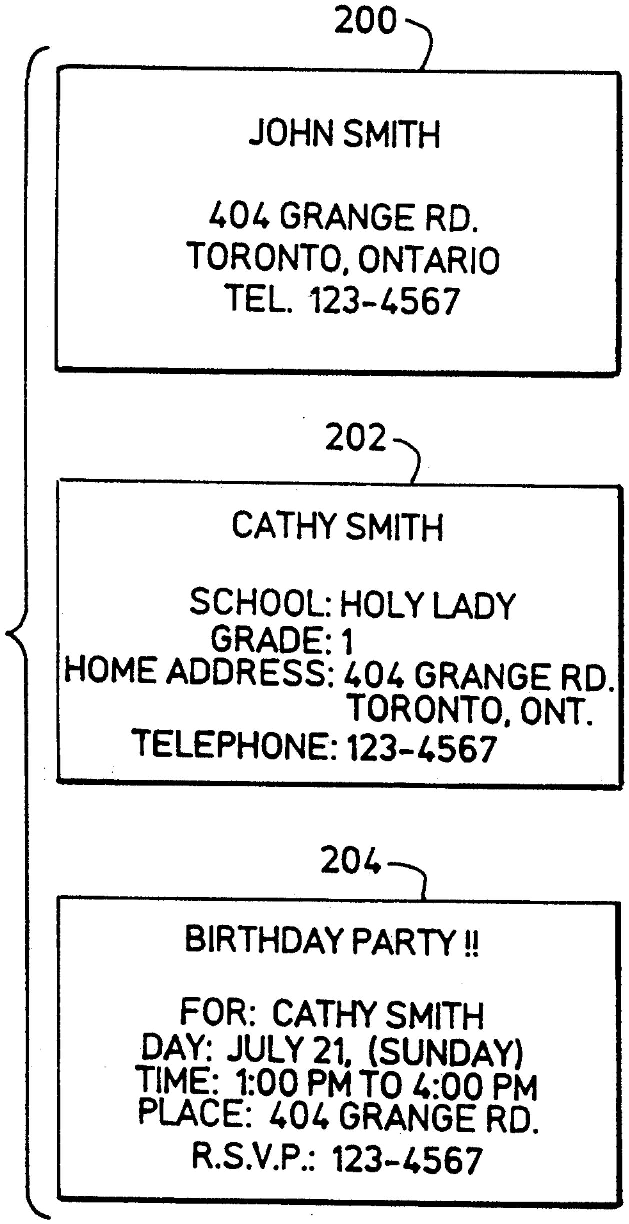
FIG. 9 illustrates a series of printed card formats available to be printed using the vending machine of the subject invention.

Card formats which are available are numerous and include name and address cards, change of address cards, various formats of business cards and party invitation cards, just to mention a few. FIG. 9 illustrates several sample card formats available which can be chosen including name and address cards shown at 200 in FIG. 9, a student identification card at 202 and a birthday invitation at 204. It will be appreciated that any format may be programmed and included.

Figure 10:
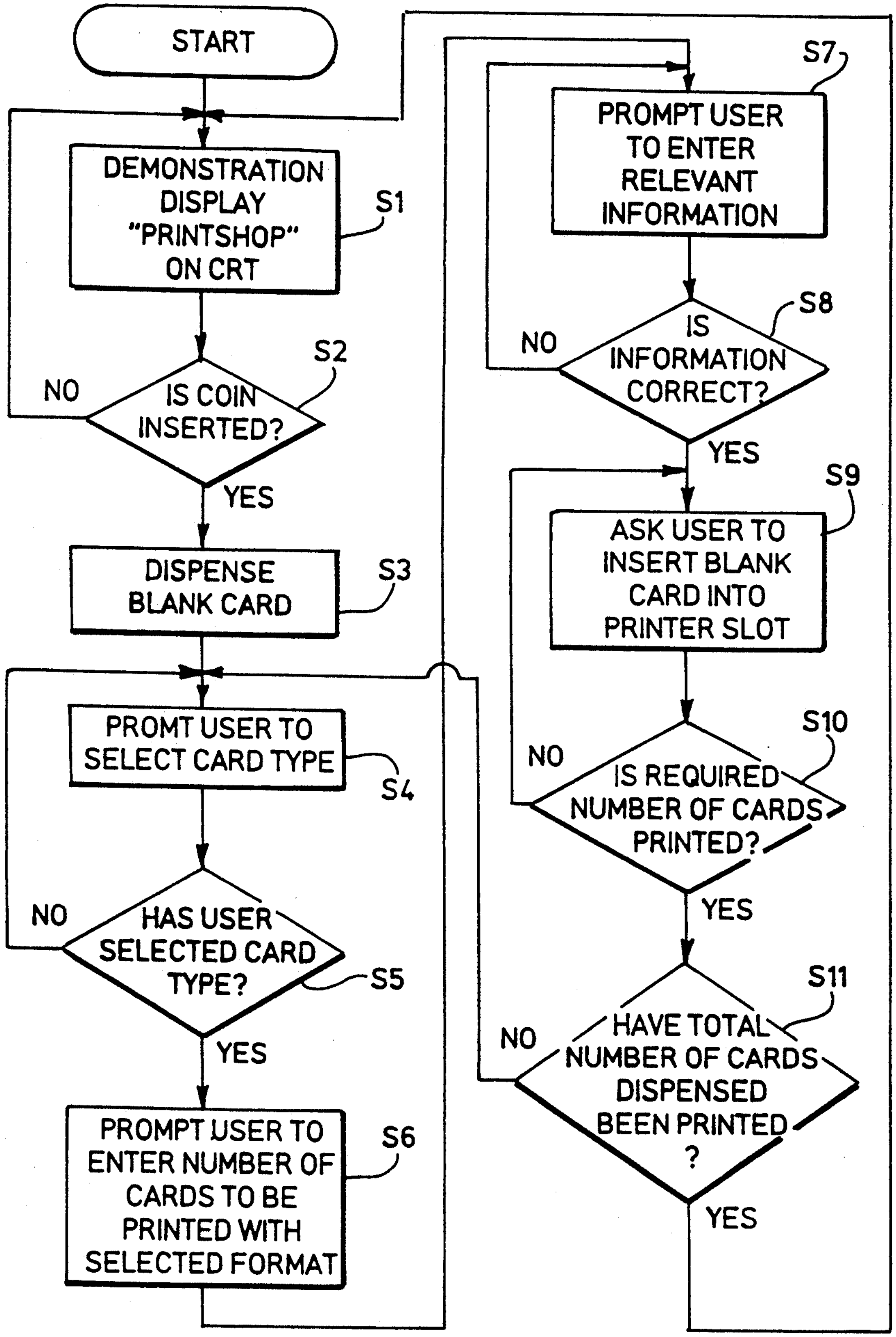
FIG. 10 is a flowchart of the algorithm for the software controlling the vending machine.

The CPU of computer 12 is connected for interactive communication and is operated according to an interactive control program illustrated in the flow chart of FIG. 12. For purposes of clarification, the different steps in the vending operation are indicated by step numbers prefixed by the letter S in the flowchart of FIG. 10.

When not in use the vending machine displays the demonstration logo "PRINTSHOP" on CRT 18, step 1. When the user inserts the minimum preset amount of money into coin acceptor 20, step 2, card dispenser 22 is activated and a sub-stack of blank cards is dispensed from card magazine 34 to access slot 38, step 3. Next, computer 12 to goes into an interactive mode and commands CRT 18 to display a series of questions and instructions in a sequential manner to the user. The first instruction displayed on CRT 18 prompts the user to select the type of card format to be printed, step 4. The user responds by entering a code from a series of codes which correspond to the desired card format, step 5. Next, the user is prompted to enter the number of cards from the sub-stack to be printed with the selected format. The user enters a number from 1 to a number less than or equal to the number of cards in the sub-stack dispensed, step 6. After the number of cards to be printed with the selected format is input, a series of prompts are displayed on CRT 18 to which the use responds by entering the relevant data, step 7. For example, if the name and address card format has been selected and the number of cards with this format selected, the user will be prompted to enter their name, address and phone number. After the last prompt has been responded to, the user is instructed to verify that the input data is correct, step 8. If the user enters No, they will be prompted to re-enter the correct data. If the user enters Yes, they will be instructed to insert blank card to printer slot 24 in step 9. Printer 20 will then print the data entered into RAM memory onto the blank card. After the card is printed the user is asked if the desired number of cards has been printed, step 10; if the customer responds No the program returns to step 9 where they are again prompted to insert a blank card into the printer and the process is repeated until the desired number of cards with the selected format have been printed. If the user responds Yes, then the control program determines if the number of cards printed with the selected format is equal to the total number of cards dispensed, step 11. If not, then the program returns to step 4 where the user is prompted to select the card type to be printed. If the number of cards printed equals the total number of cards dispensed then CRT 18 displays the demonstration "PRINTSHOP" and the interactive computer connection is broken as the program returns to step 1.

While the present invention has been described and illustrated with respect to the preferred and alternative embodiments, it will be appreciated that numerous variations of these embodiments may be made without departing from the scope of the invention, which is defined in the appended claims.

I claim:

1. A vending machine for printing and dispensing user designed cards, comprising:

a) a housing;

b) card storage mans mounted in the housing for storing cards;

c) card dispensing means coupled to the storage means for dispensing cards stored therein wherein the cards are rectangular of a length greater than width and are stored in the card storage mans in a cross stacked arrangement of sub-stacks of cards, the card dispensing means comprising right angularly disposed inwardly pointing paris of opposed solenoids, the solenoids being each attached to support platforms at the inwardly pointing ends of the solenoids for supporting the card sub-stacks, said opposed solenoids and therefore the platforms movable between inward and outward limiting positions which correspond to positions of clearance with respect to the length and width of the cards;

e) control means mounted in the housing provided with manual entry means, data receiving and storage means, display means and printing means;

f) processing means for controlling the operation of the control means, the processing means responsive to data input by a user, wherein the processing means provides instructions to the user at various stages in the vending procedure which must be carried out in order to advance to the next stage of the vending procedure; and g) activation means for activating the processing means and the card dispensing means in response to the insertion of a preset amount of money or the equivalent thereof.

2. The vending machine according to claim 1 including an access slot located on the front of the housing, and including a ramp extending from substantially below the card dispensing means to the access slot.

3. The vending machine according to claim 1 wherein the activation means includes a coin acceptor and a coin detector circuit for detecting when a preset amount of money has been inserted into the coin acceptor.

4. The vending machine according to claim 1 wherein the activation means includes a credit card reader.

5. The vending machine according to claim 1 wherein the activation means includes means for determining the amount of money inserted into the coin acceptor.

6. The vending machine according to claim 1 wherein the processing means includes a central processing unit and a control program loaded into the storage means when the control means is turned on.

7. The vending machine according to claim 3 wherein the payment activation means is activated by depositing money.

8. The vending machine according to claim 4 wherein the payment activation means is activated by inserting a credit card therein.

9. The vending machine according to claim 1 wherein the card dispensing means includes detection means operably coupled to the payment activation means for detecting when a sub-stack of cards are resting on a pair of opposed support platforms so that when the present minimum amount of money is inserted into the payment activation means, only that pair of opposed platforms having cards resting thereon moves to the outward limiting position, thereby dispensing the sub-stack of cards resting thereon.

10. The vending machine according to claim 9 wherein the detection means comprise photocell detectors located above and adjacent the support platforms and oriented to detect when a sub-stack of cards is directly on a pair of opposed platforms.

11. The vending machine according to claim 9 wherein the detection means is a micro-switch located above and adjacent the support platforms and which is activated by cards resting thereon.

12. The vending machine according to claim 1 wherein the printing means is provided with a sensor means operably coupled thereto and located substantially at the card input for detecting the presence of a card and activating the card feeder mechanism only when a card is present at the card input location.

13. The vending machine according to claim 1 wherein the card storage means includes a paper roll mounted so that the paper is fed directly into the printing means.

14. The vending machine according to claim 13 wherein the card dispensing means includes a paper cutter mounted in such a way as to cut predetermined sized cards from the paper roll.

15. A vending machine for printing and dispensing user designed cards, comprising:

a) a housing provided with a card access slot located on the front of the housing;

b) a computer mounted in the housing provided with a keyboard for entering data, a memory, a cathode ray tube for displaying the data input by the customer, a printer for printing the input data onto a card and a central processing unit interconnected with the keyboard, the cathode ray tube, the memory and the printer;

c) an interactive control program for controlling the operation of the computer and printer, including displaying instructions on the cathode ray tube prompting the user to input data, commanding the memory and cathode ray tube to respectively store and display the input data, and commanding the printer to print the input data onto a card;

d) at least one card storage magazine for storing blank rectangular cards of a length greater than width, the cards stored in a cross stacked arrangement of sub-stacks of cards;

e) at least one card dispensing mechanism coupled to one card storage magazine for dispensing cards, the dispenser mechanism comprising right angularly disposed inwardly pointing pairs of opposed solenoids, the solenoids each attached to support platforms at the inwardly pointing ends of the solenoids for supporting cards, said opposed solenoids and therefore the platforms movable between inward and outward limiting positions which correspond to positions of clearance with respect to the length and width of the cards;

f) a ramp extending from below the card dispensing mechanism and the printer to the card access slot; and g) vending machine activator including a coin acceptor and a coin detector circuit responsive to a preset amount of money for activating the card dispensing means, the computer and the control program.

* * * * *

UNITED STATES PATENT AND TRADEMARK OFFICE

CERTIFICATE OF CORRECTION

PATENT NO. : 5,235,519

DATED : August 10, 1993

INVENTOR(S) : Miura

It is certified that error appears in the above-indentified patent and that said Letters Patent is hereby corrected as shown below:

Column 5, line 41 replace "s" with -- so --.

Column 6, line 34 replace "12" with -- 10 --.

Column 7, lines 27 and 32 replace "mans" with -- means --.

Signed and Sealed this

Nineteenth Day of April, 1994

Attest:

Bruce Lehman

BRUCE LEHMAN

*Attesting Officer*

*Commissioner of Patents and Trademarks*